US010151210B2

(12) United States Patent
Thomas

(10) Patent No.: US 10,151,210 B2
(45) Date of Patent: Dec. 11, 2018

(54) ENDWALL CONTOURING FOR AIRFOIL ROWS WITH VARYING AIRFOIL GEOMETRIES

(71) Applicant: UNITED TECHNOLOGIES CORPORATION, Hartford, CT (US)

(72) Inventor: Flavien L. Thomas, Moodus, CT (US)

(73) Assignee: United Technologies Corporation, Farmington, CT (US)

( * ) Notice: Subject to any disclaimer, the term of this patent is extended or adjusted under 35 U.S.C. 154(b) by 528 days.

(21) Appl. No.: 14/816,113

(22) Filed: Aug. 3, 2015

(65) Prior Publication Data

US 2016/0076392 A1 Mar. 17, 2016

Related U.S. Application Data

(60) Provisional application No. 62/049,391, filed on Sep. 12, 2014.

(51) Int. Cl.

*F01D 11/00* (2006.01)
*F01D 5/02* (2006.01)

(Continued)

(52) U.S. Cl.

CPC .............. *F01D 11/008* (2013.01); *F01D 5/02* (2013.01); *F01D 5/143* (2013.01); *F01D 5/147* (2013.01); *F01D 9/041* (2013.01); *F04D 29/324* (2013.01); *F04D 29/544* (2013.01); *F04D 29/545* (2013.01); *F01D 11/005* (2013.01); *F05D 2220/32* (2013.01); *F05D 2230/60* (2013.01); *F05D 2240/12* (2013.01);

(Continued)

(58) Field of Classification Search

CPC ........ F01D 11/008; F01D 5/143; F01D 5/147; F01D 5/02; F05D 2260/961

See application file for complete search history.

(56) References Cited

U.S. PATENT DOCUMENTS 6,663,346 B2 12/2003 Munsell et al.
6,669,445 B2 12/2003 Staubach (Continued)

FOREIGN PATENT DOCUMENTS

WO 2013186756 A1 12/2013
WO 2014130332 A1 8/2014

OTHER PUBLICATIONS

European Search Report for European Application No. 15184513.8 dated Feb. 24, 2016.

*Primary Examiner* — Richard Edgar
*Assistant Examiner* — Danielle M Christensen
(74) *Attorney, Agent, or Firm* — Carlson, Gaskey & Olds, P.C.

(57) ABSTRACT

An airfoil array for a gas turbine engine comprises a plurality of airfoils spaced circumferentially apart from each other about an engine center axis. Each airfoil is associated with a platform. An endwall extends circumferentially about the engine center axis, and is defined by adjacent platforms. Each pair of adjacent platforms are separated from each other by a gap. An endwall contour shape extends from a first location on one side of the gap to a second location on an opposite of the gap. The endwall contour shape is the same for all adjacent platforms. A gas turbine engine and a method of forming an airfoil array for a gas turbine engine are also disclosed.

19 Claims, 5 Drawing Sheets

60 66 66 76 66 62 62 72 70 68 68 74 64

(51) Int. Cl.

| | |
|---|---|
| ***F01D 5/14*** | (2006.01) |
| ***F01D 9/04*** | (2006.01) |
| ***F04D 29/54*** | (2006.01) |
| ***F04D 29/32*** | (2006.01) |

(52) U.S. Cl.

CPC ...... *F05D 2240/24* (2013.01); *F05D 2240/55* (2013.01); *F05D 2240/80* (2013.01); *F05D 2250/70* (2013.01); *F05D 2260/961* (2013.01); *Y02T 50/673* (2013.01)

(56) References Cited

U.S. PATENT DOCUMENTS

| | | | | |
|---|---|---|---|---|
| 7,090,466 | B2 | 8/2006 | Honkomp et al. | |
| 7,600,972 | B2 | 10/2009 | Benjamin et al. | |
| 7,708,528 | B2 | 5/2010 | Couch et al. | |
| 7,874,794 | B2 | 1/2011 | Solomon et al. | |
| 8,105,019 | B2 | 1/2012 | McCaffrey et al. | |
| 8,459,956 | B2 * | 6/2013 | Pandey | F01D 5/143 416/190 |
| 9,650,915 | B2 * | 5/2017 | Calza | F01D 25/06 |
| 2012/0099995 | A1 | 4/2012 | Delvaux et al. | |
| 2013/0108433 | A1 | 5/2013 | Green et al. | |
| 2014/0072432 | A1 | 3/2014 | Woehler et al. | |
| 2014/0090380 | A1 | 4/2014 | Aggarwala et al. | |
| 2014/0090401 | A1 | 4/2014 | Praisner et al. | |
| 2014/0154068 | A1 | 6/2014 | Aggarwala et al. | |

* cited by examiner

A
28
46
59
57
54
38
20
26
56
50
32
36
30
52
24
25
40
44
38
14V
15
FES
48
22
B
42
C

ENDWALL CONTOURING FOR AIRFOIL ROWS WITH VARYING AIRFOIL GEOMETRIES

CROSS-REFERENCE TO RELATED APPLICATION

This application claims priority to U.S. Provisional Patent Application No. 62/049,391, filed Sep. 12, 2014.

BACKGROUND OF THE INVENTION

In rotating turbomachinery, such as compressor and turbine stages of gas turbine engines, flow passages are defined by airfoil surfaces and an endwall. The airfoils are supported on platform structures that are circumferentially spaced about an engine center axis. The platform structures together form the endwall. Each platform structure is separated from an adjacent platform structure by a gap. Seals are provided at these gaps to seal the flow passages.

When defining the endwall contour shape for compressor or turbine rows that have varying platform geometries from passage to passage, typically due to strut machining, the contoured endwall shape has to vary to fit within the passage shape. Whether the endwall shape is scaled to fit the passage, or is specifically designed for each passage, a mismatch might be created at the platform gap. This mismatch is aerodynamically undesirable as it will result in an increase in loss. Also, different seals will be required to seal the gap between each combination of adjacent platforms, which increases cost.

SUMMARY OF THE INVENTION

In a featured embodiment, an airfoil array for a gas turbine engine comprises a plurality of airfoils spaced circumferentially apart from each other about an engine center axis. Each airfoil is associated with a platform. An endwall extends circumferentially about the engine center axis, and is defined by adjacent platforms. Each pair of adjacent platforms are separated from each other by a gap. An endwall contour shape extends from a first location on one side of the gap to a second location on an opposite of the gap. The endwall contour shape is the same for all adjacent platforms.

In another embodiment according to the previous embodiment, the plurality of airfoils includes at least a first airfoil type and a second airfoil type that is different than the first airfoil type.

In another embodiment according to any of the previous embodiments, the plurality of airfoils includes a pair of first airfoil types that are adjacent to each other with each first airfoil type having a first platform type. The endwall contour shape comprises a first endwall contour shape that is defined by a first portion extending from the first location on one of the first platform types to the gap and a second portion extending from the opposite side of the gap to the second location on the other of the first platform types. The shape includes a first additional endwall contour extending from the first location to a first area adjacent to the airfoil associated with the one of the first platform types, and a second additional endwall contour extending from the second location to a second area adjacent to the airfoil associated with the other of the first platform types.

In another embodiment according to any of the previous embodiments, the plurality of airfoils includes a pair of second airfoil types that are adjacent to each other with each second airfoil type having a second platform type. The endwall contour shape further comprises a second endwall contour shape that is defined by a first portion extending from the first location on one of the second platform types to the gap and a second portion extending from the opposite side of the gap to the second location on the other of the second platform types. The shape includes a third additional endwall contour extending from the first location to a third area adjacent to the airfoil associated with the one of the second platform types and a fourth additional endwall contour extending from the second location to a fourth area adjacent to the airfoil associated with the other of the second platform types. The second endwall contour shape is identical to the first endwall contour shape.

In another embodiment according to any of the previous embodiments, the first additional endwall contour is different than the second additional endwall contour.

In another embodiment according to any of the previous embodiments, the third additional endwall contour is different than the fourth additional endwall contour.

In another embodiment according to any of the previous embodiments, the first and second additional endwall contours are different than the third and fourth additional endwall contours.

In another embodiment according to any of the previous embodiments, the plurality of airfoils includes a first airfoil type adjacent to a second airfoil type. The endwall contour shape further comprises a third endwall contour shape that is defined by a first portion extending from the first location on the first platform type to the gap and a second portion extending from the opposite side of the gap to the second location on the second platform type. A fifth additional endwall contour is included extending from the first location to a fifth area adjacent to the airfoil associated with the first platform type and a sixth additional endwall contour extending from the second location to a sixth area adjacent to the airfoil associated with the second platform type. The third endwall contour shape is identical to the first and second endwall contour shapes.

In another embodiment according to any of the previous embodiments, the endwall contour shape defines a first endwall portion. The first location is on a first platform with a first airfoil and the second location is on a second platform with a second airfoil. The first location is circumferentially spaced apart from a side of the first airfoil by a first distance that defines a second endwall portion. The second location is circumferentially spaced apart from a side of the second airfoil by a second distance to form a third end wall portion such that an endwall segment extends from the first airfoil to the second endwall and is entirely defined by the first, second, and third endwall portions.

In another embodiment according to any of the previous embodiments, the first and second airfoils are different types from each other or are the same type as each other. The first end wall portion is the same when the first and second airfoils are different from, or the same as, each other.

In another featured embodiment, a gas turbine engine comprises a compressor section, a combustor section downstream of the compressor section, and a turbine section downstream of the combustor section. At least one of the combustor section, the turbine section, or a fan exit guide vane section, include an airfoil array that is comprised of a plurality of airfoils spaced circumferentially apart from each other about an engine center axis. Each airfoil is associated with a platform. An endwall extends circumferentially about the engine center axis. The endwall is defined by adjacent platforms. Each pair of adjacent platforms are separated from each other by a gap. The plurality of airfoils includes at least a first airfoil on a first platform and a second airfoil on a second platform. The first and second platforms are separated from each other by the gap. An endwall contour shape is defined to extend from a first location on the first platform to a second location on the second platform. The endwall contour shape is the same for all adjacent platforms.

In another embodiment according to the previous embodiment, an endwall segment extends from one side of the first airfoil and across the gap to a side of the second airfoil that faces the first airfoil. The endwall contour shape defines a first endwall portion of the endwall segment. The first location is circumferentially spaced apart from the side of the first airfoil by a first distance that defines a second endwall portion. The second location is circumferentially spaced apart from the side of the second airfoil by a second distance to form a third end wall portion such that the endwall segment is entirely defined by the first, second, and third endwall portions.

In another embodiment according to any of the previous embodiments, the first and second airfoils are different types from each other or are the same type as each other. The first end wall portion is the same if the first and second airfoils are different from each other or if the first and second airfoils are the same as each other.

In another embodiment according to any of the previous embodiments, the second and third endwall portions are different from the first end wall portion.

In another embodiment according to any of the previous embodiments, the second and third endwall portions are different from each other.

In another featured embodiment, a method of forming an airfoil array for a gas turbine engine comprises the steps of spacing a plurality of airfoils circumferentially apart from each other about an engine center axis. Each airfoil is associated with a platform. An endwall is formed that extends circumferentially about the engine center axis. The endwall is defined by adjacent platforms. Each pair of adjacent platforms are separated from each other by a gap. The plurality of airfoils includes at least a first airfoil on a first platform and a second airfoil on a second platform with the first and second platforms being separated from each other by the gap. An endwall contour is shaped to extend from a first location on the first platform to a second location on the second platform. The endwall contour is shaped to be the same for all adjacent platforms regardless of airfoil type.

In another embodiment according to the previous embodiment, an endwall segment is defined as extending from one side of the first airfoil, across the gap, and to a side of the second airfoil that faces the first airfoil. The endwall contour is defined to comprise a first endwall portion of the endwall segment. The first location is spaced circumferentially apart from the side of the first airfoil by a first distance that defines a second endwall portion. The second location is spaced circumferentially apart from the side of the second airfoil by a second distance to form a third end wall portion such that the endwall segment is entirely defined by the first, second, and third endwall portions.

In another embodiment according to any of the previous embodiments, the first and second airfoils are different types from each other or are the same type as each other. The first end wall portion is the same if the first and second airfoils are different from each other or if the first and second airfoils are the same as each other.

In another embodiment according to any of the previous embodiments, the first and second airfoils are different types from each other, and include blending a first transition from the first location to match a platform profile for the first airfoil type to form the second endwall portion, and blending a second transition from the second location to match a platform profile for the second airfoil type to form the third endwall portion.

In another embodiment according to any of the previous embodiments, the second and third endwall portions are different from the first end wall portion, and are different from each other.

These and other features may be best understood from the following drawings and specification.

DETAILED DESCRIPTION

Figure 1:
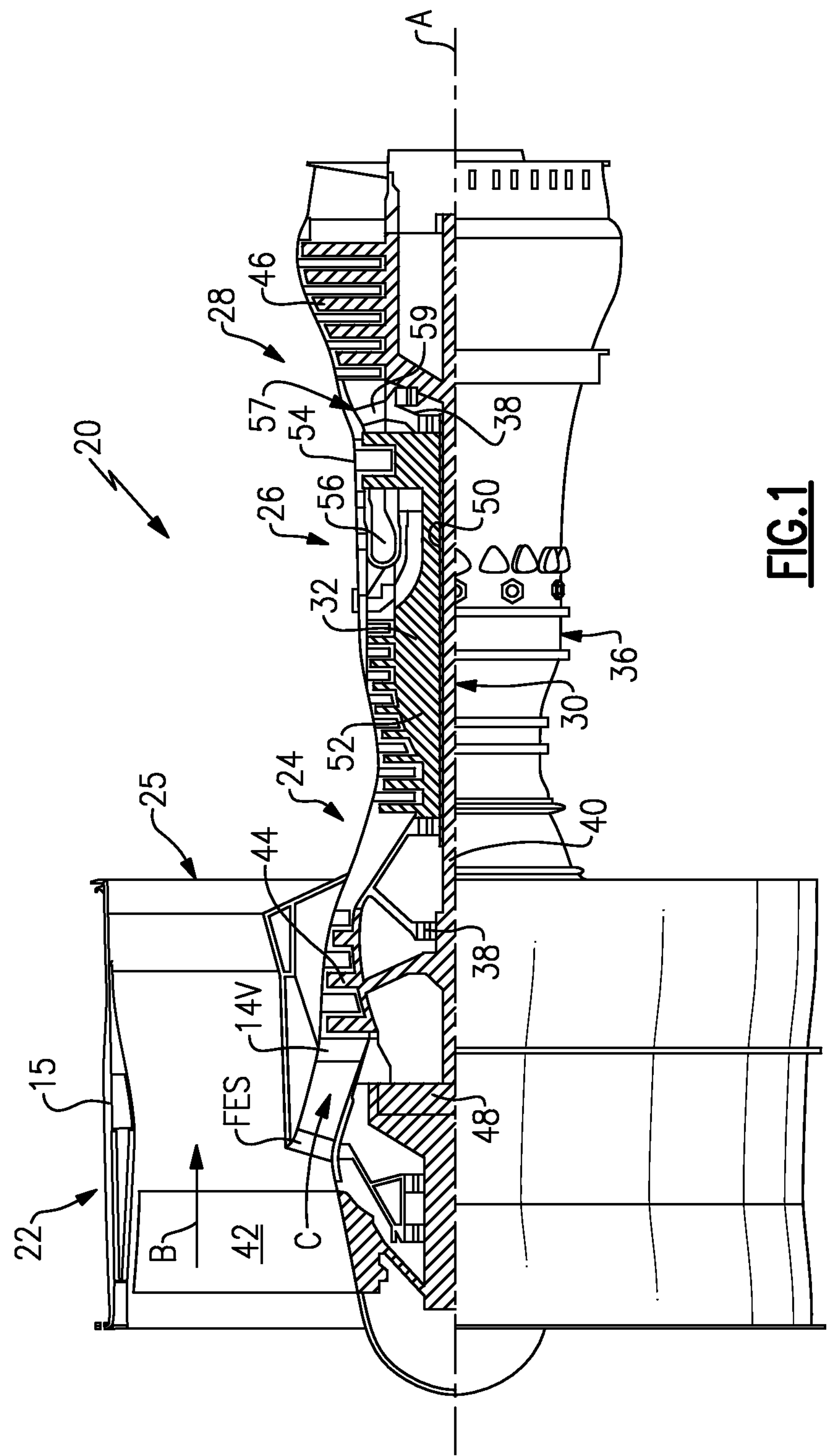
FIG. 1 is a schematic representation of one example of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram}° \text{ R})/(518.7° \text{ R})]^{0.5}$. The "Low corrected fan tip speed" as disclosed herein according to one non-limiting embodiment is less than about 1150 ft/second.

Figure 2:
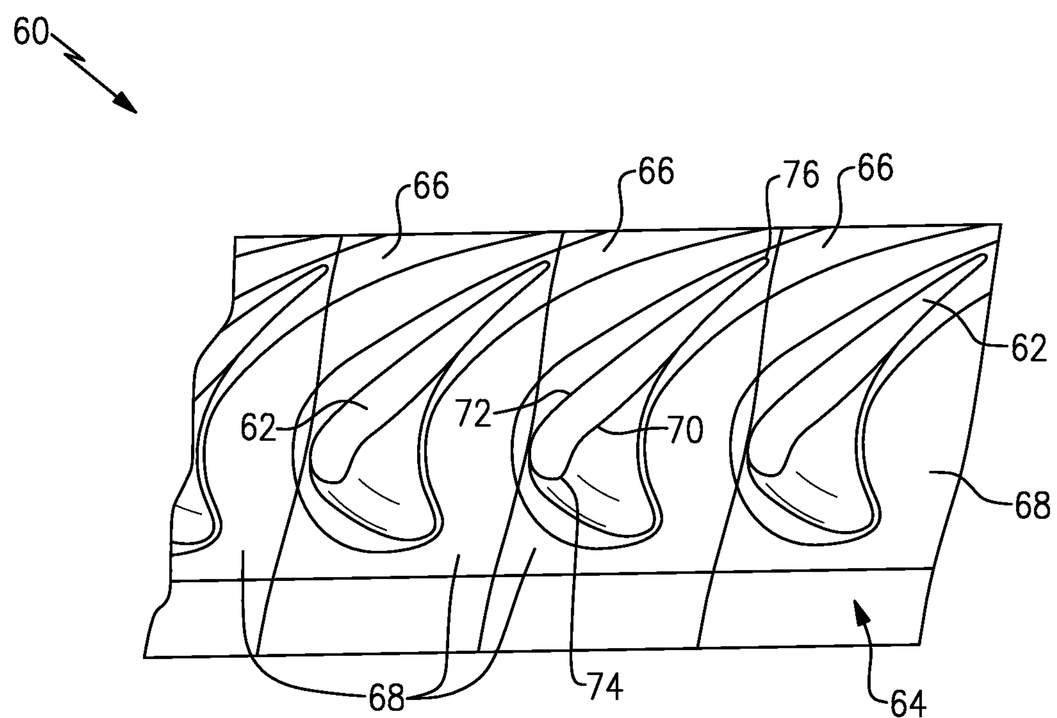
FIG. 2 is a top view of an array of airfoils on an endwall.

The turbine section 28, the compressor section 24, or a fan exit guide vane 25 may include at least one airfoil array 60 as shown in FIG. 2. The airfoil array 60 is comprised of a plurality of airfoils 62 projecting radially from an endwall 64. For example, the airfoils 62 may be provided as a stage of rotor blades or stator vanes in the compressor section 24 or the turbine section 28. The endwall 64 may be either an inner diameter endwall or an outer diameter endwall or both. The airfoils 62 are circumferentially spaced apart from each other about the engine center axis A to define a plurality of flow passages 66 between adjacent airfoils 62.

Each airfoil 62 is supported by a platform 68 that forms part of the endwall 64. Each airfoil 62 has a first side 70 and a second side 72 that extend from a leading edge 74 to a trailing edge 76. Fluid flow moves toward the flow passages 66 from a position forward of the leading edge 74 as indicated by the arrow 78 in FIG. 3.

Figure 3:
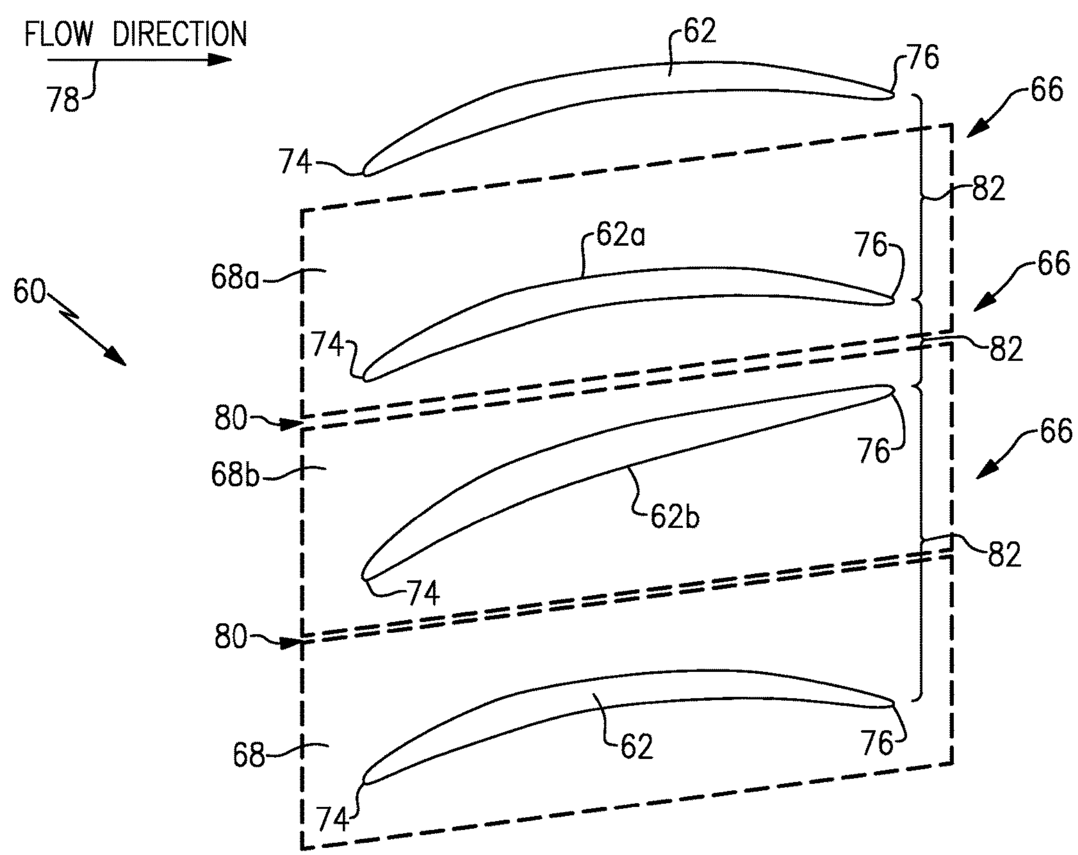
FIG. 3 is a schematic top view of an array showing at least two different types of airfoils.

The endwall 64 extends circumferentially about the engine center axis A and is defined by the adjacent platforms 68. Each pair of adjacent platforms 68 are separated from each other by a gap 80 as shown in FIG. 3. The endwall 64 is configured to have an endwall contour shape defined to extend from a first location on one side of the gap 80 to a second location on an opposite of the gap 80. This endwall contour shape is a common shape for all adjacent platforms 68 regardless of the type of airfoil 62. This will be discussed in greater detail below.

FIG. 3 shows an example where two different types of airfoils 62 are located adjacent to each other. A first type of airfoil **62*a* is supported on a first platform 68*a* and a second type of airfoil 62*b* is supported on a second platform 68*b*. The types of airfoils differ from each other, for example, in curvature as the airfoils 62*a*, 62*b* extend from the leading edge 74 to the trailing edge 76, and/or in location on the respective platform 68*a*, 68*b*. As shown, when different types of airfoils 62*a*, 62*b* are positioned adjacent to each other, a trailing edge area 82, which corresponds to an exit area for the flow passages 66, varies between the adjacent trailing edges 76 of the airfoils 62, 62*a*, 62*b*. It should be noted that while two different types of airfoils 62*a*, 62*b* are schematically shown in the examples, additional types of airfoils having other shapes and geometries could also be utilized in the array 60**.

The different platforms **68*a*, 68*b* present varying platform geometries from passage 66 to passage 66. These variations create a mismatch at the platform gap. This mismatch is aerodynamically undesirable as it increases losses. Additionally, different seals (not shown) will be required to seal the gaps 80 for each different combination of adjacent platforms 68**.

Figure 4:
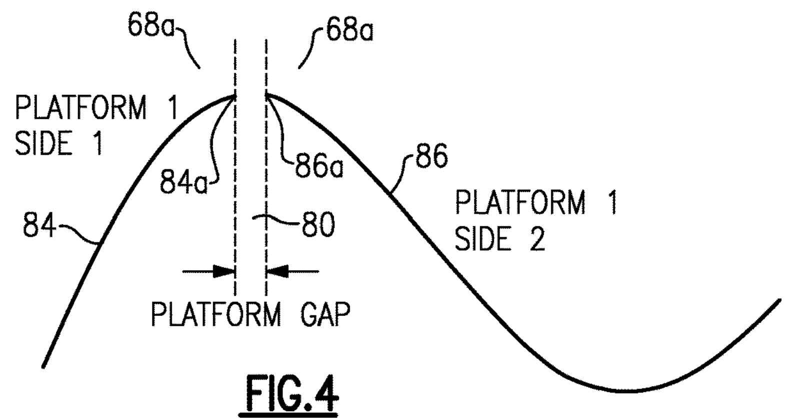
FIG. 4 is a schematic front view of two adjacent airfoils of the first type.

FIG. 4 is a front view of two adjacent platforms **68*a* for the first type of airfoil 62*a*. A first endwall contour shape 84 is positioned on one side of the gap 80 and a second endwall contour shape 86 is positioned on an opposite side of the gap 80. In this example, the first 84 and second 86 endwall contour shapes terminate at locations 84*a*, 86*a* that directly face each other across the gap 80**.

Figure 5:
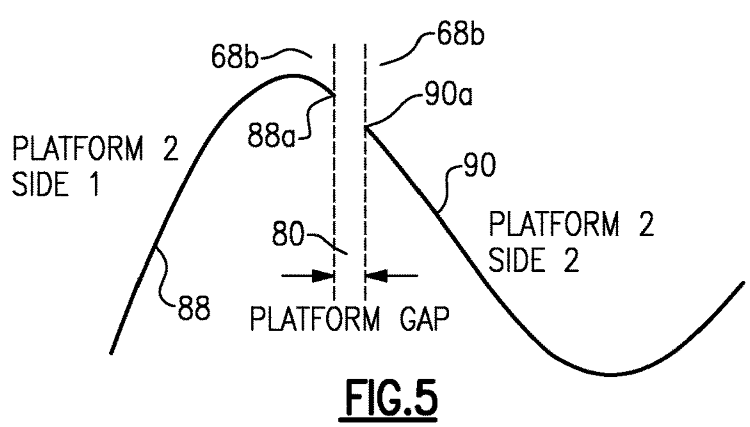
FIG. 5 is a schematic front view of two adjacent airfoils of the second type.

FIG. 5 is a front view of two adjacent platforms **68*b* for the second type of airfoil 62*b*. A first endwall contour shape 88 is positioned on one side of the gap 80 and a second endwall contour shape 90 is positioned on an opposite side of the gap 80. In this example, the first 88 and second 90 endwall contour shapes terminate at locations 88*a*, 90*a* that are not directly across from each other at the gap 80. The first location 88*a* is above the second location 90*a*, i.e. the locations 88*a*, 90*a* are offset from each other. However, once the gap is sealed, a continuously smooth surface made up of the seal and endwall contour shapes 88 and 90** will be created.

Figure 6:
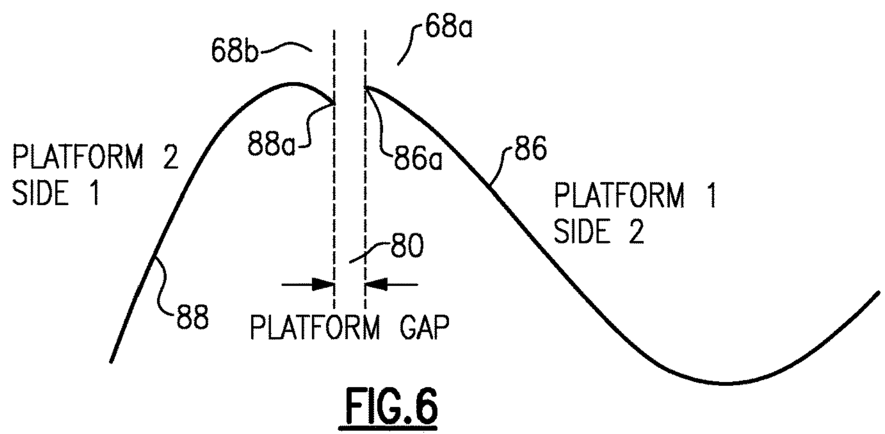
FIG. 6 is a schematic front view of a first type of airfoil adjacent to a second type of airfoil.

FIG. 6 is a front view of showing a first type of platform 68*a* adjacent to a second type of platform 68*b*. The first type of platform 68*a* has the second endwall contour shape 86 (as shown in FIG. 4) on the right side of the gap 80 when viewing FIG. 6. The second type of platform 68*b* has the first endwall contour shape 88 (as shown in FIG. 5) on the left side of the gap 80. In this example, the first endwall contour shape 88 and second endwall contour shape 86 terminate at locations 88*a*, 86*b* that are not directly across from each other at the gap 80. The first location 88*a* is below the second location 86*b*, i.e. the locations are offset from each other. The offset shown in FIG. 6 is different than the offset shown in FIG. 5. Once the gap is sealed, the surface created by the seal and endwall contour shapes 86 and 88 will not be smooth and continuous.

Figure 7:
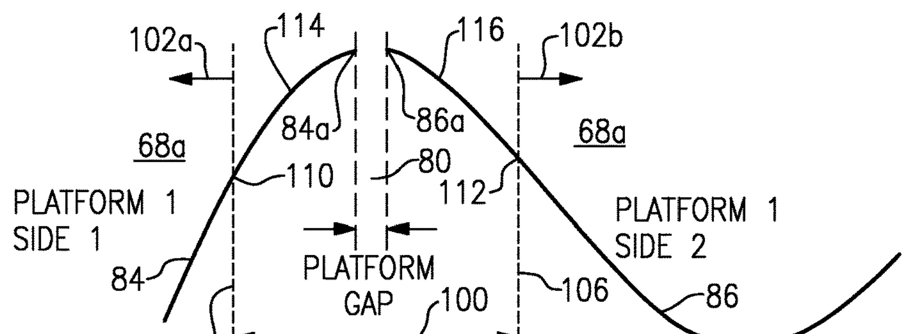
FIG. 7 is a schematic front view of a common endwall contour region for two adjacent airfoils of the first type.
Figure 8:
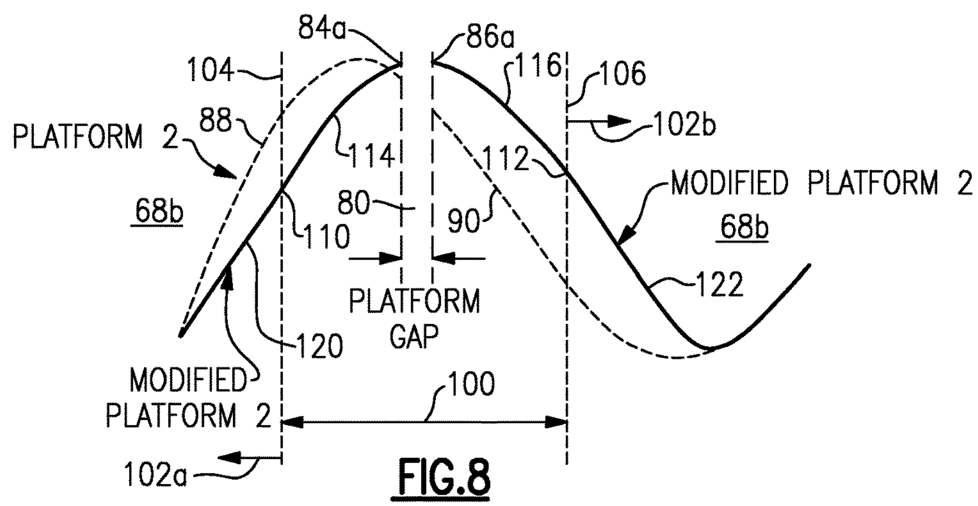
FIG. 8 is a schematic front view of a common endwall contour region for two adjacent airfoils of the second type.
Figure 9:
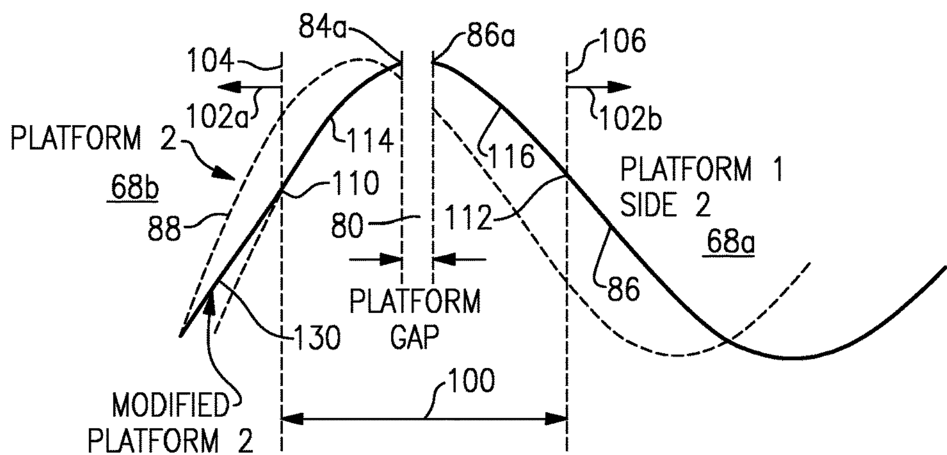
FIG. 9 is a schematic front view of a common endwall contour region for a first type of airfoil adjacent to a second type of airfoil.

The subject invention provides a common endwall shape in a region 100 near the platform gap 80 as shown in FIGS. 7-9. Within this region 100, the endwall shape is identical regardless of the overall platform geometry. Outside of the region 100 in the remaining areas 102*a*, 102*b* between the respective airfoils 62, 62*a*, 62*b* and edges 104, 106 of the common region 100, the endwall contouring would vary to smoothly blend back into the optimal design shape for the respective airfoil. The edges 104, 106 are located at predetermined locations on either side of the gap 80. An endwall segment that includes the areas 102*a*, 102*b* and the region 100 extends between facing sides of adjacent airfoils.

FIG. 7 shows a front view of two adjacent platforms 68*a* for the first type of airfoil 62*a*. The first endwall contour shape 84 and second endwall contour shape 86 are the same as those shown in FIG. 4. In this example, the first 84 and second 86 endwall contour shapes terminate at edge locations 110, 112 that respectively correspond to the edges 104, 106 of the common endwall contour region 100. Within the common region 100 there is a first endwall region shape 114 on one side of the gap 80 and a second endwall region shape 116 on the opposite side of the gap 80.

FIG. 8 shows a front view of two adjacent platforms 68*b* for the second type of airfoils 62*b*. The first endwall contour shape 88 and the second endwall contour shape 90 are shown in dotted lines. The first endwall contour shape 88 and second endwall contour shape 90 are the same as those shown in FIG. 5. Portions of these contour shapes 88, 90 are modified within the common region 100 to match the shapes shown in FIG. 7. Thus, within the common region 100, the first endwall contour shape 88 is shaped to be identical to the first endwall region shape 114 and the second endwall contour shape 90 is shaped to be identical to the second endwall region shape 116. Once the first endwall region shape 114 reaches the edge location 110, the endwall shape for the remaining area 102*a* is blended back into the first endwall contour shape 88 as indicated at 120. Once the second endwall contour shape 116 reaches the edge location 112, the endwall shape for the remaining area 102*b* is blended back into the second endwall contour shape 90 as indicated at 122. Thus, the endwall contour shapes for the two adjacent second platform types 68*b* terminate at the same locations 84*a*, 86*a* across the gap 80 as with two adjacent first platform types 68*a*.

FIG. 9 shows a front view of a first type of platform 68*a* adjacent to a second type of platform 68*b*. The first type of platform 68*a* has the second endwall contour shape 86 (identical to that of FIG. 7) on the right side of the gap 80 when viewing FIG. 9. The second type of platform 68*b* has the first endwall contour shape 88 (as shown in dashed lines) on the left side of the gap 80. As the second endwall contour shape 86 is identical to the shape shown in FIG. 7, there is no need to modify the first type of platform 68*a* within the common region 100. A portion the first contour shape 88 is modified within the common region 100 to match the shape shown in FIG. 7. Thus, within the common region 100, the first endwall contour shape 88 is shaped to be identical to the first endwall region shape 114 and the second endwall contour shape 86 is already shaped to be identical to the second endwall region shape 116.

Once the first endwall region shape 114 reaches the edge location 110, the endwall shape for the remaining area 102*a* is blended back into the first endwall contour shape 88 as indicated at 130. Once the second endwall contour shape 86 reaches the edge location 112, it remains the identical shape to that shown in FIG. 7. Thus, the endwall contour shapes for a first type of platform 68*a* adjacent to a second type of platform 68*b* terminate at the same locations 84*a*, 86*a* across the gap 80 as with two adjacent first platform types 68*a* and as with two adjacent second platform types 68*b*.

The subject invention allows for common platform to platform interface regardless of which combination of adjacent platforms is used. By eliminating the mismatch at the platform gap, the aerodynamic impact of using endwall contouring for arrays with rows having varying platform geometry is improved. Further, only one type of platform gap seal is required, which reduces the number of parts and cost associated with the endwall contouring design.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. An airfoil array for a gas turbine engine comprising:

a plurality of airfoils spaced circumferentially apart from each other about an engine center axis, each airfoil being associated with a platform, and wherein the plurality of airfoils includes at least a first airfoil type and a second airfoil type that is different than the first airfoil type;

an endwall extending circumferentially about the engine center axis, the endwall being defined by adjacent platforms, and wherein each pair of adjacent platforms are separated from each other by a gap, and wherein when the first airfoil type is adjacent the second airfoil type an offset is potentially created between associated platforms of the first airfoil type and the second airfoil type; and an endwall contour shape configured to eliminate the offset between associated platforms of the first airfoil type and the second airfoil type, the endwall contour shape defined to extend from a first location on one side of the gap to a second location on an opposite of the gap, and wherein the endwall contour shape is the same for all adjacent platforms.

2. The airfoil array according to claim 1, wherein the plurality of airfoils includes a pair of first airfoil types that are adjacent to each other with each first airfoil type having a first platform type, and wherein the endwall contour shape comprises a first endwall contour shape that is defined by a first portion extending from the first location on one of the first platform types to the gap and a second portion extending from the opposite side of the gap to the second location on the other of the first platform types, and including a first additional endwall contour extending from the first location to a first area adjacent to the airfoil associated with the one of the first platform types and a second additional endwall contour extending from the second location to a second area adjacent to the airfoil associated with the other of the first platform types.

3. The airfoil array according to claim 1, wherein the endwall contour shape defines a first endwall portion, and wherein the first location is on a first platform with a first airfoil and the second location is on a second platform with a second airfoil, and wherein the first location is circumferentially spaced apart from a side of the first airfoil by a first distance that defines a second endwall portion, and wherein the second location is circumferentially spaced apart from a side of the second airfoil by a second distance to form a third end wall portion such that an endwall segment extending from the first airfoil to the second endwall is entirely defined by the first, second, and third endwall portions.

4. The airfoil array according to claim 3, wherein the plurality of airfoils include at least the first and second airfoils that are different types from each other and includes at least one pair of airfoils that are the same type as each other, and wherein the first end wall portion is the same when the first and second airfoils are different from each other, or if the pair of airfoils is the same as each other.

5. An airfoil array for a gas turbine engine comprising:

a plurality of airfoils spaced circumferentially apart from each other about an engine center axis, each airfoil being associated with a platform, and wherein the plurality of airfoils includes at least a first airfoil type and a second airfoil type that is different than the first airfoil type;

an endwall extending circumferentially about the engine center axis, the endwall being defined by adjacent platforms, and wherein each pair of adjacent platforms are separated from each other by a gap;

an endwall contour shape defined to extend from a first location on one side of the gap to a second location on an opposite of the gap, and wherein the endwall contour shape is the same for all adjacent platforms;

wherein the plurality of airfoils includes a pair of first airfoil types that are adjacent to each other with each first airfoil type having a first platform type, and wherein the endwall contour shape comprises a first endwall contour shape that is defined by a first portion extending from the first location on one of the first platform types to the gap and a second portion extending from the opposite side of the gap to the second location on the other of the first platform types, and including a first additional endwall contour extending from the first location to a first area adjacent to the airfoil associated with the one of the first platform types and a second additional endwall contour extending from the second location to a second area adjacent to the airfoil associated with the other of the first platform types; and wherein the plurality of airfoils includes a pair of second airfoil types that are adjacent to each other with each second airfoil type having a second platform type, and wherein the endwall contour shape further comprises a second endwall contour shape that is defined by a first portion extending from the first location on one of the second platform types to the gap and a second portion extending from the opposite side of the gap to the second location on the other of the second platform types, and including a third additional endwall contour extending from the first location to a third area adjacent to the airfoil associated with the one of the second platform types and a fourth additional endwall contour extending from the second location to a fourth area adjacent to the airfoil associated with the other of the second platform types, and wherein the second endwall contour shape is identical to the first endwall contour shape.

6. The airfoil array according to claim 5, wherein the first additional endwall contour is different than the second additional endwall contour.

7. The airfoil array according to claim 5, wherein the third additional endwall contour is different than the fourth additional endwall contour.

8. The airfoil array according to claim 5, wherein the first and second additional endwall contours are different than the third and fourth additional endwall contours.

9. The airfoil array according to claim 5, wherein the plurality of airfoils includes a first airfoil type adjacent to a second airfoil type, and wherein the endwall contour shape further comprises a third endwall contour shape that is defined by a first portion extending from the first location on the first platform type to the gap and a second portion extending from the opposite side of the gap to the second location on the second platform type, and including a fifth additional endwall contour extending from the first location to a fifth area adjacent to the airfoil associated with the first platform type and a sixth additional endwall contour extending from the second location to a sixth area adjacent to the airfoil associated with the second platform type, and wherein the third endwall contour shape is identical to the first and second endwall contour shapes.

10. A gas turbine engine comprising:

a compressor section;

a combustor section downstream of the compressor section; and a turbine section downstream of the combustor section, and wherein at least one of the combustor section, the turbine section, or a fan exit guide vane section, include an airfoil array that is comprised of a plurality of airfoils spaced circumferentially apart from each other about an engine center axis, each airfoil being associated with a platform, and wherein the plurality of airfoils includes at least a first airfoil type and a second airfoil type that is different than the first airfoil type, an endwall extending circumferentially about the engine center axis, the endwall being defined by adjacent platforms, and wherein each pair of adjacent platforms are separated from each other by a gap, and wherein when the first airfoil type is adjacent the second airfoil type an offset is potentially created between associated platforms of the first airfoil type and the second airfoil type, and wherein the plurality of airfoils includes at least a first airfoil on a first platform and a second airfoil on a second platform with the first and second platforms being separated from each other by the gap; and an endwall contour shape configured to eliminate the offset between associated platforms of the first airfoil type and the second airfoil type, the endwall contour shape defined to extend from a first location on the first platform to a second location on the second platform, and wherein the endwall contour shape is the same for all adjacent platforms.

11. The gas turbine engine according to claim 10, wherein an endwall segment is defined as extending from one side of the first airfoil and across the gap to a side of the second airfoil that faces the first airfoil, and wherein the endwall contour shape defines a first endwall portion of the endwall segment, and wherein the first location is circumferentially spaced apart from the side of the first airfoil by a first distance that defines a second endwall portion, and wherein the second location is circumferentially spaced apart from the side of the second airfoil by a second distance to form a third end wall portion such that the endwall segment is entirely defined by the first, second, and third endwall portions.

12. The gas turbine engine according to claim 11, wherein the plurality of airfoils include at least the first and second airfoils that are different types from each other, and at least one pair of airfoils that are the same type as each other, and wherein the first end wall portion is the same if the first and second airfoils are different from each other or if the airfoils are the same as each other.

13. The gas turbine engine according to claim 12, wherein the second and third endwall portions are different from the first end wall portion.

14. The gas turbine engine according to claim 12, wherein the second and third endwall portions are different from each other.

15. A method of forming an airfoil array for a gas turbine engine comprising the steps of:

spacing a plurality of airfoils circumferentially apart from each other about an engine center axis, each airfoil being associated with a platform;

forming an endwall that extends circumferentially about the engine center axis, the endwall being defined by adjacent platforms, and wherein each pair of adjacent platforms are separated from each other by a gap;

wherein the plurality of airfoils includes at least a first airfoil type on a first platform and a second airfoil type on a second platform with the first and second platforms being separated from each other by the gap, and the second airfoil type being different than the first airfoil type, and wherein when the first airfoil type is adjacent the second airfoil type an offset is potentially created between associated platforms of the first airfoil type and the second airfoil type; and shaping an endwall contour to eliminate the offset between associated platforms of the first airfoil type and the second airfoil type and to extend from a first location on the first platform to a second location on the second platform, wherein the endwall contour is shaped to be the same for all adjacent platforms regardless of airfoil type.

16. The method according to claim 15 including defining an endwall segment as extending from one side of the first airfoil type, across the gap, and to a side of the second airfoil type that faces the first airfoil type, defining the endwall contour to comprise a first endwall portion of the endwall segment, spacing the first location circumferentially apart from the side of the first airfoil type by a first distance that defines a second endwall portion, and spacing the second location circumferentially apart from the side of the second airfoil type by a second distance to form a third end wall portion such that the endwall segment is entirely defined by the first, second, and third endwall portions.

17. The method according to claim 16, wherein the plurality of airfoils include at least the first and second airfoil types that are different types from each other and include at least one pair of airfoil types that are the same type as each other, and wherein the first end wall portion is the same if the first and second airfoil types are different from each other or if the airfoil types are the same as each other.

18. The method according to claim 16, wherein the second and third endwall portions are different from the first end wall portion, and are different from each other.

19. A method of forming an airfoil array for a gas turbine engine comprising the steps of:

spacing a plurality of airfoils circumferentially apart from each other about an engine center axis, each airfoil being associated with a platform;

forming an endwall that extends circumferentially about the engine center axis, the endwall being defined by adjacent platforms, and wherein each pair of adjacent platforms are separated from each other by a gap;

wherein the plurality of airfoils includes at least a first airfoil on a first platform and a second airfoil on a second platform with the first and second platforms being separated from each other by the gap;

shaping an endwall contour to extend from a first location on the first platform to a second location on the second platform, wherein the endwall contour is shaped to be the same for all adjacent platforms regardless of airfoil type;

defining an endwall segment as extending from one side of the first airfoil, across the gap, and to a side of the second airfoil that faces the first airfoil;

defining the endwall contour to comprise a first endwall portion of the endwall segment;

spacing the first location circumferentially apart from the side of the first airfoil by a first distance that defines a second endwall portion, and spacing the second location circumferentially apart from the side of the second airfoil by a second distance to form a third end wall portion such that the endwall segment is entirely defined by the first, second, and third endwall portions; and wherein the first and second airfoils are different types from each other and wherein the first end wall portion is the same if the first and second airfoils are different from each other, and including blending a first transition from the first location to match a platform profile for the first airfoil type to form the second endwall portion, and blending a second transition from the second location to match a platform profile for the second airfoil type to form the third endwall portion.

* * * * *